United States Patent
Yoshida et al.

(10) Patent No.: US 8,283,088 B2
(45) Date of Patent: Oct. 9, 2012

(54) SILANE CROSSLINKED STRUCTURE-INTRODUCED FUEL-CELL POLYMER ELECTROLYTE MEMBRANE AND FUEL-CELL ELECTRODE ASSEMBLY HAVING THE SAME

(75) Inventors: Masaru Yoshida, Takasaki (JP); Masaharu Asano, Takasaki (JP); Jinhua Chen, Takasaki (JP); Yasunari Maekawa, Takasaki (JP); Toshimitsu Tachibana, Ibaraki (JP); Yozo Nagai, Ibaraki (JP); Soji Nishiyama, Ibaraki (JP)

(73) Assignees: Japan Atomic Energy Agency, Ibaraki (JP); Nitto Denko Corporation, Osaka (JP)

( * ) Notice: Subject to any disclaimer, the term of this patent is extended or adjusted under 35 U.S.C. 154(b) by 596 days.

(21) Appl. No.: 12/311,570

(22) PCT Filed: Sep. 5, 2007

(86) PCT No.: PCT/JP2007/067339
§ 371 (c)(1),
(2), (4) Date: Sep. 4, 2009

(87) PCT Pub. No.: WO2008/044405
PCT Pub. Date: Apr. 17, 2008

(65) Prior Publication Data
US 2010/0040927 A1    Feb. 18, 2010

(30) Foreign Application Priority Data
Oct. 6, 2006  (JP) ................. 2006-275122

(51) Int. Cl.
*H01M 8/10*  (2006.01)
(52) U.S. Cl. ......... 429/493; 429/479; 429/491; 429/492
(58) Field of Classification Search .................. 429/493, 429/479, 491, 492
See application file for complete search history.

(56) References Cited

U.S. PATENT DOCUMENTS

| 5,817,718 | A | 10/1998 | Nezu et al. |
| 5,994,426 | A | 11/1999 | Nezu et al. |
| 6,224,994 | B1 | 5/2001 | Asukabe et al. |
| 2006/0134493 | A1 | 6/2006 | Yoshida et al. |
| 2009/0017358 | A1* | 1/2009 | Kawada ................... 429/33 |

FOREIGN PATENT DOCUMENTS

| EP | 1879198 | 1/2008 |
| JP | 9-102322 | 4/1997 |
| JP | 11-204121 | 7/1999 |
| JP | 2002-313364 | 10/2002 |
| JP | 2003-272663 | 9/2003 |
| JP | 2005-71694 | 3/2005 |
| JP | 2006-179301 | 7/2006 |
| JP | 2006-313659 | 11/2006 |
| WO | WO 2005/001037 | 1/2005 |
| WO | 2006/120871 A1 | 11/2006 |

OTHER PUBLICATIONS

International Search Report for International Application PCT/JP2007/067339, mailed Sep. 5, 2007.

* cited by examiner

*Primary Examiner* — Douglas McGinty
(74) *Attorney, Agent, or Firm* — Staas & Halsey LLP

(57) ABSTRACT

An object is to provide an electrolyte membrane that maintains excellent cell characteristics for a long time under high temperature and low water retention, as this is the most important point in fuel cells.

A process for producing a polymer electrolyte membrane for fuel cells is provided, which process comprises in sequence: forming graft molecular chains by graft-polymerization of a vinyl silane coupling agent on a polymer film substrate that has phenyl groups capable of holding sulfonic acid groups; introducing sulfonic acid groups into phenyl groups contained in the graft molecular chains; and hydrolyzing and condensing alkoxy groups contained in the graft molecular chains so that a silane crosslinked structure is introduced between the graft molecular chains. A polymer electrolyte membrane produced by the process is also provided.

17 Claims, No Drawings

SILANE CROSSLINKED STRUCTURE-INTRODUCED FUEL-CELL POLYMER ELECTROLYTE MEMBRANE AND FUEL-CELL ELECTRODE ASSEMBLY HAVING THE SAME

CROSS REFERENCE TO RELATED APPLICATIONS

This application claims the benefit under 35 U.S.C. Section 371, of PCT International Application PCT/JP2007/067339 filed Sep. 5, 2007, which claimed priority to Japanese Application 2006-275122 filed Oct. 6, 2006 in the Japanese Patent Office, the disclosures of which are hereby incorporated by reference.

TECHNICAL FIELD

The present invention relates to polymer electrolyte membranes that are suitable for use in fuel cells and have excellent oxidation resistance, dimensional stability, and proton conductivity.

The present invention also relates to processes for producing the polymer electrolyte membranes, which processes are characterized by comprising: forming graft molecular chains by use of a vinyl monomer having phenyl groups capable of holding sulfonic acid groups, a vinyl silane coupling agent having phenyl groups capable of holding sulfonic acid groups, a vinyl silane coupling agent that contains no phenyl group, a polyfunctional vinyl monomer to which a chemical crosslinked structure is introducible, or combinations thereof; and introducing a silane crosslinked structure between the molecular chains.

The present invention also relates to membrane-electrode assemblies that have the polymer electrolyte membranes and are suitable for use in fuel cells.

BACKGROUND ART

Having high energy density, fuel cells with polymer electrolyte membranes are expected to serve as power supplies or convenient auxiliary power supplies for mobile devices, household cogeneration systems, and automobiles, using methanol, hydrogen or the like as fuel. Development of polymer electrolyte membranes with excellent properties is one of the most critical aspects of the fuel cell technology.

In a fuel cell with a polymer electrolyte membrane, the electrolyte membrane works to conduct protons and serves as a diaphragm that prevents direct mixing of the fuel hydrogen or methanol with the oxidant air (oxygen). The membrane needs to have the following properties to work as an electrolyte membrane: high ion-exchange capacity; excellent chemical stability, as electric current is to be applied for a long period of time, especially high resistance (oxidation resistance) to hydroxide radicals and the like, which are main factors that cause the membrane to deteriorate; heat resistance at cell operating temperature, that is, 80° C. and above; and constant and high water retention in order to keep electrical resistance low. To serve as a diaphragm, on the other hand, the electrolyte membrane is required to have excellent mechanical strength and dimensional stability and not to allow excessive hydrogen gas, methanol, or oxygen gas to pass through the membrane.

Early fuel cells using polymer electrolyte membranes employed a hydrocarbon-containing polymer electrolyte membrane produced by copolymerization of styrene and divinylbenzene. However, this electrolyte membrane was not so practical because it was very poor in durability due to its oxidation resistance; later, use of perfluorosulfonic acid-containing membranes such as Nafion® developed by DuPont has become popular.

Although the conventional fluorine-containing polymer electrolyte membranes such as Nafion® have excellent chemical durability and stability, they are low in ion-exchange capacity, approximately 1 mmol/g, and insufficient in water retention. Thus, there have been problems that ion-exchange membranes dry out to cause a decrease in proton conductivity and that, in the case in which methanol is used as fuel, swelling of the electrolyte membranes and/or cross-over of the methanol occur.

There has been another problem. Since no crosslinked structure is introduced in the polymer chains, introduction of. a greater amount of sulfonic acid groups in order to increase the ion-exchange capacity leads to a significant decrease in strength due to swelling of the membrane. This causes the membrane to break easily. Therefore, with the conventional fluorine-containing polymer electrolyte membranes, the amount of sulfonic acid groups needs to be adjusted such that the strength of the membrane is maintained. Thus, it has only been possible to produce membranes with an ion-exchange capacity of approximately 1 mmol/g.

In the field of graft polymerization using ionizing radiation, which is a technique related closely to the present invention, it has been tried to produce solid polymer electrolyte membranes by a process in which monomers to which sulfonic acid groups are introducible are graft-polymerized on polymer membranes.

The present inventors have studied to develop the new solid polymer electrolyte membranes. As a result, they have developed a solid polymer electrolyte membrane that is characterized by controllability of ion-exchange capacity over a wide range and is producible by first performing radiation-induced grafting polymerization to introduce styrene monomers into a polytetrafluoroethylene film to which a radiation-induced crosslinked structure is. only introducible at a temperature of 340±5° C. in an inert gas atmosphere, and then performing sulfonation, as well as a process for producing this membrane (Patent Document 1). The polymer electrolyte membrane, however, has a problem. Since the styrene graft chains in the polymer electrolyte membrane are composed of hydrocarbons, part of the graft chains becomes oxidized when electric current is applied to the membrane for a long period of time. This lowers the ion-exchange capacity of the membrane.

The present inventors have studied in view of this problem. As a result, they have developed a solid polymer electrolyte membrane that is characterized by a large ion-exchange capacity and excellent oxidation resistance and is developed by radiation-induced graft polymerization or radiation-induced graft copolymerization of fluorine-containing monomers on a polytetrafluoroethylene film having a crosslinked structure and then introducing sulfonic groups into the resulting graft chains, as well as and a process for producing the membrane (Patent Document 2). However, it has been found that, with an ordinary fluorine-containing polymer membrane used as the polymer substrate, the graft polymerization of the fluorine-containing monomers does not proceed to an inner part of the membrane easily and, depending on the reaction conditions, the graft polymerization is effective only on a surface of the substrate. Therefore, it is difficult to provide electrolyte membranes having improved in properties.

The present inventors have studied further to advance the processing technologies using radiation. As a result, they have developed a process for producing an electrolyte membrane that is characterized by having better oxidation resistance performance than the conventional membranes, which process is characterized in that ethylene-tetrafluoroethylene copolymers to which a radiation-induced crosslinked structure is easily introducible in an inert gas atmosphere at a temperature close to room temperature or other polymers as a partially-fluorinated polymer film substrate are used (polymer film substrates containing a main chain in which a hydrocarbon bonded to a fluorocarbon appears as a repeating unit, e.g., polyvinylidene fluoride having —$CH_2$—$CF_2$— as a repeating unit), and styrene derivatives or multicomponent monomers containing styrene derivatives are introduced into an inner part of the substrate by use of radiation-induced grafting, and then molecular chains that the substrate has, graft molecular chains, and the graft chains and the molecular chains that the substrate has are re-irradiated with radiation to introduce a multi-crosslinked structure, and finally sulfonation is performed (Japanese Patent Application No. 2005-170798).

Having the multi-crosslinked structure between the main chain and the graft molecular chains that the polymer film substrate has, the thus prepared polymer electrolyte membrane is significantly improved in oxidation resistance. However, when the polymer electrolyte membrane undergoes cell operation for a long period of time at high temperature, part of the graft molecular chains deteriorates due to swelling or suffers a decrease in water retention. This leaves a problem in terms of use at practical level.

[Patent Document 1] JP 2001-348439 A
[Patent Document 2] JP 2002-348389 A

DISCLOSURE OF THE INVENTION

Problems to be Solved by the Invention

In view of the problem, the present inventors have studied further. They performed ionizing radiation-induced graft polymerization of a functional vinyl silane coupling agent that would enable an electrolyte membrane to have oxidation resistance and heat resistance, to prevent permeation of fuel, to have high proton conductivity and the like, whereby graft molecular chains became present in the polymer film substrate at a proper density and became controllable in length and amount. They found that the membrane could be given high conductivity at low degree of grafting by any of the following ways although this had been impossible in the past: introducing a three-dimensional network structure by silane crosslinking; forming a multi-crosslinked structure between graft molecular chains and the substrate under conditions that would allow radiation-induced crosslinking reactions to occur preferentially; or introducing a single string-shaped graft chain from a surface to an inner part of the substrate by use of photografting polymerization in order to prevent deterioration in properties inherent in the substrate.

In view of the foregoing, the present invention has as an object to provide an electrolyte membrane that maintains excellent cell characteristics for a long time under high temperature and low water retention, as this is the most important point in fuel cells, by making full use of the steps mentioned above and the heat-resisting and water-retaining performances that are inherent properties of silanes.

Means for Solving the Problems

The object is solved by the following aspects of the present invention.

A first aspect of the present invention is that, in a polymer electrolyte membrane for fuel cells, graft molecular chains formed by graft-polymerization of a vinyl monomer have been introduced into a polymer film substrate, the graft molecular chains have phenyl groups holding sulfonic acid groups, and a silane crosslinked structure has been introduced between the graft molecular chains.

A second aspect of the present invention is that, in the polymer electrolyte membrane for fuel cells according to the first aspect of the present invention, a multi-crosslinked structure has been introduced between molecular chains that the polymer film substrate has, between the graft molecular chains to which the silane crosslinked structure has been introduced, and between the molecular chains that the polymer film substrate has and the graft molecular chains to which the silane crosslinked structure has been introduced.

A third aspect of the present invention is that, in the polymer electrolyte membrane according to the first or second aspect of the present invention, the polymer film substrate is composed of an olefinic polymer or a fluorine-containing polymer.

A fourth aspect of the present invention is that a process for producing a polymer electrolyte membrane for fuel cells comprises in sequence: forming graft molecular chains by graft-polymerization of a vinyl silane coupling agent to a polymer film substrate, the vinyl silane coupling agent having phenyl groups capable of holding sulfonic acid groups; introducing sulfonic acid groups into phenyl groups contained in the graft molecular chains; and hydrolyzing and condensing alkoxy groups contained in the graft molecular chains so that a silane crosslinked structure is introduced between the graft molecular chains.

A fifth aspect of the present invention is that a process for producing a polymer electrolyte membrane for fuel cells comprises in sequence: forming graft molecular chains by graft-polymerization of a vinyl monomer solution on a polymer film substrate, the vinyl monomer solution containing a vinyl silane coupling agent having phenyl groups capable of holding sulfonic acid groups; introducing sulfonic acid groups into phenyl groups contained in the graft molecular chains; and hydrolyzing and condensing alkoxy groups contained in the graft molecular chains so that a silane crosslinked structure is introduced between the graft molecular chains.

A sixth aspect of the present invention is that a process for producing a polymer electrolyte membrane for fuel cells comprises in sequence: forming graft molecular chains by graft-polymerization of a vinyl monomer solution on a polymer film substrate, the vinyl monomer solution being composed of a vinyl monomer having phenyl groups capable of holding sulfonic acid groups, and a vinyl silane coupling agent containing no phenyl group; introducing sulfonic acid groups into phenyl groups contained in the graft molecular chains; and hydrolyzing and condensing alkoxy groups contained in the graft molecular chains so that a silane crosslinked structure is introduced between the graft molecular chains.

A seventh aspect of the present invention is that a process for producing a polymer electrolyte membrane for fuel cells comprises in sequence: forming graft molecular chains by graft-polymerization of a vinyl monomer solution on a polymer film substrate, the vinyl monomer solution being composed of a vinyl monomer having phenyl groups capable of holding sulfonic acid groups, and a vinyl silane coupling agent containing no phenyl group; hydrolyzing and condensing alkoxy groups contained in the graft molecular chains so that a silane crosslinked structure is introduced between the graft molecular chains; and introducing sulfonic acid groups into phenyl groups contained in the graft molecular chains.

An eighth aspect of the present invention is that, in the process for producing a polymer electrolyte membrane for fuel cells according to the sixth or seventh aspect of the present invention, in the step of forming the graft molecular chains, a vinyl silane coupling agent having phenyl groups capable of holding sulfonic acid groups is combined with the vinyl monomer solution.

A ninth aspect of the present invention is that, in the process for producing an electrolyte membrane for fuel cells according to any one of the fourth to eighth aspects of the present invention, in the step of forming the graft molecular chains, a polyfunctional vinyl monomer to which a chemical crosslinked structure is introducible is combined with the vinyl monomer solution.

A tenth aspect of the present invention is that the process for producing an electrolyte membrane for fuel cells according to the fifth, seventh, or eighth aspect of the present invention further includes, following the step of introducing the silane crosslinked structure, applying γ-rays, electron beams, or X-rays to introduce a radiation-induced multi-crosslinked structure between molecular chains that the polymer film substrate has, between the graft molecular chains to which the silane crosslinked structure has been introduced, and between the molecular chains that the polymer film substrate has and the graft molecular chains to which the silane crosslinked structure has been introduced, and thereafter introducing the sulfonic acid groups.

An eleventh aspect of the present invention is that, in the process for producing an electrolyte membrane for fuel cells according to any one of the fourth to tenth aspects of the present invention, in the step of introducing the graft molecular chains, the graft-polymerizing is performed by use of radicals generated by irradiating the polymer film substrate with γ-rays, electron beams, or X-rays.

A twelfth aspect of the present invention is that, in the process for producing an electrolyte membrane for fuel cells according to any one of the fourth to tenth aspects of the present invention, in the step of introducing the graft molecular chains, the graft-polymerizing is performed by use of radicals generated during a process of applying a photopolymerization initiator to the polymer film substrate and irradiating the polymer film substrate with ultraviolet rays.

A thirteenth aspect of the present invention is that the polymer electrolyte membrane for fuel cells according to any one of the fourth to twelfth aspects of the present invention further includes, prior to the step of introducing the graft molecular chains, the step of irradiating the polymer film substrate with ionizing radiation in advance so that a crosslinked structure is introduced.

A fourteenth aspect of the present invention is that, in the polymer electrolyte membrane for fuel cells according to any one of the fourth to thirteenth aspects of the present invention, the polymer film substrate is composed of an olefinic polymer or a fluorine-containing polymer.

A fifteenth aspect of the present invention is that a membrane-electrode assembly for fuel cells includes the polymer electrolyte membrane according to any one of the first to third aspects of the present invention that is closely attached to a membrane electrode.

Advantages of the Invention

The polymer electrolyte membranes produced according to the processes of the present invention are characterized in that they have excellent oxidation resistance, high electrical conductivity, water retention and dimensional stability under high temperature, and methanol resistance, and that the ion-exchange capacity of the membranes is controllable over a wide range. The polymer electrolyte membranes of the present invention with the foregoing properties are suitable especially for use as fuel cell membranes.

EMBODIMENT OF THE INVENTION

The present invention provides polymer electrolyte membranes that are suitable for use in fuel cells and have high electrical conductivity, oxidation resistance, heat resistance, and water retention. The present invention also provides processes for producing the polymer electrolyte membranes.

First, the process for producing a polymer electrolyte membrane for fuel cells according to the present invention is characterized in that either a polymer film substrate is irradiated with ionizing radiation so that radicals are generated evenly throughout the substrate, ranging from a surface to an inner part thereof, or a surface layer that is applied to the polymer film substrate and contains a photopolymerization initiator is irradiated with ultraviolet rays so that radicals are generated only on the surface of the substrate.

Second, the process of the present invention is characterized in that, using the radicals, graft polymerization of vinyl monomers is performed by use of a vinyl monomer having phenyl groups capable of holding sulfonic acid groups, a vinyl silane coupling agent having phenyl groups capable of holding sulfonic acid groups, a vinyl coupling agent containing no phenyl group, a polyfunctional vinyl monomer to which a chemical crosslinked structure is introducible, or combinations thereof.

Third, the process of the present invention is characterized in that alkoxy groups contained in graft molecular chains to which sulfonic acid groups have been or have not been introduced are converted into silanol groups by hydrolysis reaction and then treated with heat to be condensed, whereby a silane crosslinked structure is introduced between the graft molecular chains, and, in some cases, an ionizing-radiation-induced multi-crosslinked structure is introduced between the graft molecular chains, between the graft molecular chains and molecular chains that the substrate has, and between the molecular chains that the substrate has.

The polymer electrolyte membrane of the present invention is characterized in that the degree of grafting of vinyl monomers to the polymer film substrate is 10% to 80% and the ion-exchange capacity is 0.7 mmol/g to 3.3 mmol/g in the case in which ionizing-radiation-induced radicals are used. On the other hand, in the case in which ultraviolet-rays-induced radicals are used, it is possible to provide high electrical conductivity even if the degree of grafting is low because graft molecular chains that hold sulfonic acid groups and which are each in the form of a single string penetrates through a cross section of the membrane. In this case, the degree of grafting of vinyl monomers to the polymer film substrate is 2% to 40% and the ion-exchange capacity is 0.1 mmol/g to 2.0 mmol/g.

The term "polymer film substrate" as used herein means a film-shaped polymer material that serves as a substrate for an electrolyte membrane. Any fluorocarbon-containing polymer, such as polytetrafluoroethylene (PTFE), tetrafluoroethylene-hexafluoropropylene copolymers (FEP), and tetrafluoroethylene-perfluoroalkylvinylether copolymers (PFA), is usable as the polymer film substrate in the present invention. Fluorocarbon/hydrocarbon-containing polymers, such as ethylene-tetrafluoroethylene copolymers (ETFE) and polyvinylidene fluoride (PVdF), are also usable. Any hydrocarbon-containing polymer is also usable, such as high-molecular-weight polyethylene, polypropylene, polystyrene, polyamide, aromatic polyamide, polyethyleneterephthalate, polyethylene naphthalate, polycarbonate, polyether ketone, polyether ether ketone, polyether sulfone, polyphenylene sulfide, polyimide, polyetherimide, polyamide-imide, polybenzimidazole, and polyetheretherimide. In some cases, blend polymers are also usable. Further, the polymer film substrate is not particularly limited as long as it allows graft molecular chains to be introduced into an inner part of the polymer film substrate with the use of radicals generated by irradiation with ionizing radiation or ultraviolet rays. Further, the polymer film substrate is not particularly limited as long as it allows a crosslinked structure to be introduced in the case where graft molecular chains introduced by irradiation with ionizing radiation are subjected to multi-crosslinking with the main chain of the substrate that forms its skeleton. Further, it is also possible in the present invention to use a polymer film substrate that is so selected that an ionizing-radiation-induced crosslinked structure can be introduced into it before graft molecular chains are introduced.

In the present invention, at least a member or a mixture of members may be selected from the group consisting of the following Groups A to D for use as the vinyl monomer or monomers that are to be graft-polymerized on the polymer film substrate. Group A includes vinyl silane coupling agents having phenyl groups capable of holding sulfonic acid groups. Group B includes vinyl silane coupling agents containing no phenyl group. Group C includes vinyl monomers having phenyl groups capable of holding sulfonic acid groups. Group D includes polyfunctional vinyl monomers.

(1) Group A

A vinyl silane coupling agent having phenyl groups capable of holding sulfonic acid groups, as selected from the group consisting of p-styryltrimethoxysilane, p-styryltriethoxysilane, p-styryltriethoxysilane and the like.

(2) Group B

A vinyl silane coupling agent containing no phenyl group, as selected from the group consisting of vinyltrimethoxysilane, vinyltriethoxysilane, vinyltris-(β-methoxyethoxy)silane, vinyltriacetoxysilane, allyltrimethoxysilane, allyltriacetoxysilane, vinylmethyldimethoxysilane, vinyldimethylmethoxysilane, vinylmethyldiethoxysilane, vinyldimethylethoxysilane, vinylmethyldiacetoxysilane, vinyldimethylacetoxysilane, vinylisobutyldimethoxysilane, vinyltriisopropoxysilane, vinyltributoxysilane, vinyltrihexyloxysilane, vinylmethoxydihexyloxysilane, vinyltrioctyloxysilane, vinyldimethoxyoctyloxysilane, vinylmethoxydioctyloxysilane, vinylmethoxydilauryloxysilane, vinyldimethoxylauryloxysilane, vinylmethoxydioleyloxysilane, vinyldimethoxyoleyloxysilane and the like.

(3) Group C

A vinyl monomer having phenyl groups capable of holding sulfonic acid groups, as selected from the group consisting of: styrene; alkylstyrenes such as methylstyrenes (e.g., a-methylstyrene and vinyltoluene), ethylstyrenes, dimethylstyrenes, trimethylstyrenes, pentamethylstyrenes, diethylstyrenes, isopropylstyrenes, and butylstyrenes (e.g., 3-tert-butylstyrene and 4-tert-butylstyrene); halogenated styrenes such as chlorostyrenes, dichlorostyrenes, trichlorostyrenes, bromostyrenes (e.g., 2-bromostyrene, 3-bromostyrene, and 4-bromostyrene), and fluorostyrenes (2-fluorostyrene, 3-fluorostyrene, and 4-fluorostyrene); alkoxystyrenes such as methoxystyrenes, methoxymethylstyrenes, dimethoxystyrenes, ethoxystyrenes, and vinylphenyl allyl ethers; hydroxystyrene derivatives such as hydroxystyrenes, methoxyhydroxystyrenes, acetoxystyrenes, and vinylbenzyl alkyl ethers; vinylbenzoic acids; carboxystyrene derivatives such as formylstyrenes; nitrostyrenes such as nitrostyrene; aminostyrene derivatives such as aminostyrenes and dimethylaminostyrenes; vinyl benzylsulfonic acids; and ion-containing styrene derivatives such as styrenesulfonyl fluorides.

(4) Group D

A polyfunctional vinyl monomer selected from the group consisting of bis(vinylphenyl)ethane, divinylbenzene, 2,4,6-triallyloxy-1,3,5-triazine(triallylcyanurate), triallyl-1,2,4-benzenetricarboxylate (triallyltrimellitate), diallyl ether, triallyl-1,3,5-triazine-2,4,6-(1H,3H,5H)-trione, 2,3-diphenylbutadiene, 1,4-diphenyl-1,3-butadiene, 1,4-divinyloctafluorobutane, bis(vinylphenyl)methane, divinylacetylene, divinyl sulfide, divinyl sulfone, divinyl ether, divinyl sulfoxide, isoprene, 1,5-hexadiene, butadiene, and 1,4-divinyl-2,3,5,6-tetrachlorobenzene.

In the case in which the graft polymerization is to be performed with ionizing radiation, it is also possible to use the monomers of groups (1)-(4) that are diluted with a solvent such as dichloroethane, chloromethane, n-hexane, alcohol, t-butanol, toluene, cyclohexane, cyclohexanone, or dimethyl sulfoxide. The graft polymerization of the vinyl monomers to the polymer film substrate is performed as follows. The polymer film substrate is put in a pressure-resistant container made of stainless steel or glass, and the container is sufficiently drawn to a vacuum. Then, the vinyl monomers from which oxygen gas has been removed by bubbling of an inert gas or by freeze-degassing are added, and 0.1 kGy to 100 kGy of γ-rays from $^{60}$Co are applied in an inert gas at room temperature. The graft polymerization can be performed by either simultaneous irradiation in which the polymer film substrate and the monomers are simultaneously irradiated to effect grafting reaction or post-graft polymerization in which the polymer film substrate is irradiated first and then brought into contact with the vinyl monomers to effect grafting reaction. The graft polymerization is performed at room temperature to 80° C. if the simultaneous irradiation is adopted, whereas it is performed at room temperature to 150° C. if the post-graft polymerization is adopted. Presence of oxygen inhibits the grafting reaction. Thus, the series of operations described above is performed in an inert gas such as argon gas or nitrogen gas, and, before the vinyl monomers or the solutions in which the vinyl monomers are dissolved in the solvents are used, oxygen is removed from the vinyl monomers or the solutions with a commonly-used treatment (bubbling or freeze-degassing).

On the other hand, in the case in which the graft polymerization is to be performed with ultraviolet rays, it is preferable to apply a photopolymerization initiator in advance to a surface layer of the polymer film substrate. Examples of the photopolymerization initiator include: xanthone derivatives that are to be activated by ultraviolet rays, such as xanthone, diethylthioxanthone, and 2-chlorothioxanthone; diazo compounds that are to be activated by ultraviolet rays, such as azobisisobutyronitrile and hydrazone; and peroxides that are to be activated by ultraviolet rays, such as benzoyl peroxide- and di-t-butyl peroxide. For the photopolymerization initiator of the present invention, it is preferable to use a chemical compound that is cleaved to generate radicals during the process of irradiation with light. Further, in order to improve the photopolymerization initiator and the polymer film substrate in terms of affinity, adhesion and the like, it is also possible to dissolve the photopolymerization initiator in an organic solvent containing polyvinyl acetate or the like, which serves as a fixative, to form an applied layer. This layer composition is obtainable by spray-coating, dipping, spin-coating or otherwise applying the photopolymerization initiator to the polymer film substrate. A preferred concentration of the photo initiator is in the range of 0.05 to 5% by weight, and a preferred concentration of the fixative is in the range of 0.01 to 3% by weight.

The photografting polymerization of the monomer to the polymer film substrate can be performed in a liquid phase system or in a gas phase system. The photografting polymerization in a liquid phase system is performed as follows. In a sealable glass ampoule equipped with a stopper, a mixture of a vinyl monomer, water, and an organic solvent is put. Then, the polymer film substrate to which the photopolymerization initiator has been applied is immersed in the mixture, and, following bubbling of an inert gas such as nitrogen gas, the graft polymerization is effected at a temperature of 40° C. to 90° C. with light being applied. On the other hand, the photografting polymerization in a gas phase system is performed as follows. In the sealable glass ampoule equipped with a stopper cock, the vinyl monomer is vaporized at a temperature of 40° C. to 90° C. in an inert gas atmosphere such as nitrogen gas and the resulting vapor is utilized to effect the photografting polymerization; the polymer film substrate to which the photopolymerization initiator has been applied is not brought into direct contact with the mixture of the vinyl monomer, the water, and the organic solvent. It is preferable that the organic solvent used in the photografting polymerization can dissolve the vinyl monomer and be soluble in water. Alcohols such as methanol, acetone, tetrahydrofuran, dimethyl sulfoxide, dimethylformamide, methylethylketone or the like are usable as the organic solvent. Further, an adequate solvent concentration in that system of the water and the organic solvent is 1 to 40 volume %. The most suitable light for effecting the graft polymerization is ultraviolet rays. Exemplary light sources for the irradiation with ultraviolet rays include ultrahigh pressure mercury lamps, high pressure mercury lamps, metal halide lamps, xenon lamps, and low pressure bactericidal lamps. A preferred period of irradiation is 10 to 600 minutes in a case in which a 400-W high pressure mercury lamp is used.

Introduction of a crosslinked structure with γ-rays, electron beams, or X-rays is performed on a polymer film substrate to which graft molecular chains have been introduced by graft polymerization. The irradiation with γ-rays, electron beams, or X-rays is performed following the step of introducing a silane crosslinked structure and prior to the step of introducing sulfonic acid groups so that a multi-crosslinked structure is formed simultaneously between molecular chains that the polymer film substrate has, between the graft molecular chains to which the silane crosslinked structure has been introduced, and between the molecular chains that the polymer film substrate has and the graft molecular chains to which the silane crosslinked structure has been introduced, whereby a fuel-cell polymer electrolyte with better oxidation resistance is produced. Further, in some cases, it is possible to form the crosslinked structure between the molecular chains that the polymer film substrate has by irradiating the polymer film substrate with ionizing radiation in advance before the graft molecular chains are introduced into the polymer film substrate.

With the polymer electrolyte membrane according to the present invention, it is possible to control the degree of grafting and/or the sulfonation reaction yield by use of the following techniques: string-shaped graft chains are introduced by photografting polymerization in which radicals that are generated only on a surface of the polymer film substrate serve as initiation points; and/or branch-shaped graft chains are introduced by ionizing radiation-induced graft polymerization using radicals that are generated not only on the surface but also in the inner part of the polymer film substrate. This makes it possible to change the ion-exchange capacity of the resulting membrane. In the present invention, it is preferable that the degree of grafting be 2% to 80%, more preferably 4% to 50%, with respect to the polymer film substrate. This preferred degree of grafting, however, varies with the specific manner of graft polymerization.

The term "ion-exchange capacity" as used herein means the amount (mmol/g) of ion-exchange groups per gram in weight of a dry electrolyte membrane. The ion-exchange capacity depends on the type of the graft monomer and the manner of graft polymerization; the ion-exchange capacity is approximately 0.1 mmol/g when the degree of grafting is approximately 2%. The membrane swells more when the degree of grafting is 80% or above. In other words, the ion-exchange capacity increases as the degree of grafting is increased to introduce more ion-exchange groups. However, if an excessive amount of ion-exchange groups is introduced, the membrane swells upon absorbing water, causing the membrane to decrease in strength. It is therefore preferable that the ion-exchange capacity of the polymer ion-exchange membrane of the present invention be 0.1 to 3.3 mmol/g, more preferably 0.1 to 2.0 mmol/g.

The water content of the polymer electrolyte membrane of the present invention is controllable by selection of graft substrates, selection of the amount of sulfonic acid groups that are to be introduced, selection of the molecular structures of the graft monomers, introduction of the silane crosslinked structure, and/or introduction of the radiation-induced multi-crosslinked structure. In the case in which the membrane is to be used as an electrolyte membrane for fuel cells, a water content that is too low is not suitable because a slight change in the operating conditions causes the electrical conductivity and/or gas permeation coefficient to change. The conventional Nafion® membrane has no crosslinked structure, and most of the molecular chains of the membrane are composed of [—$CF_2$—]. Thus, the membrane absorbs excessive water when the cell is operated at a temperature of 80° C. or above. This results in the conductivity decreasing rapidly due to swelling.

In contrast, with the polymer electrolyte membrane of the present invention, it is possible to introduce a silane crosslinked structure or introduce a radiation-induced multi-crosslinked structure between the graft molecular chains capable of holding sulfonic acid groups and the molecular chains of the polymer film substrate. Thus, the water content is controllable in the range of 5 to 80 weight (wt) %, although it depends mainly on the amount of sulfonic acid groups. In general, the water content increases with increasing ion-exchange capacity. In the case of the polymer electrolyte membrane of the present invention, however, the water content is controllable to 5 to 80 wt %, preferably 5 to 50 wt %.

To introduce the sulfonic acid groups into the graft polymer film substrate obtained by introducing the silane crosslinked structure or the radiation-induced multi-crosslinked structure, a dichloroethane solution or chloroform solution of concentrated sulfuric acid, fuming sulfuric acid, or chlorosulfonic acid may be reacted with an aromatic ring in the grafted molecular chains.

The electrical conductivity of polymer electrolyte membranes is also related to the ion-exchange capacity, and the higher the electrical conductivity of a polymer electrolyte membrane, the lower its electrical resistance and the better its performance as an electrolyte membrane. If, however, the electrical conductivity of the ion-exchange membrane at 25° C. is 0.02 ($[\Omega\cdot cm]^{-1}$) or below, the output performance as a fuel cell is more likely to decrease significantly. Therefore, a polymer electrolyte membrane is usually designed to have an electrical conductivity of 0.02 ($[\Omega\cdot cm]^{-1}$) or higher. A higher-performance polymer electrolyte membrane is designed to have an electrical conductivity of 0.10 ($[\Omega\cdot cm]^{-1}$) or higher. With the polymer electrolyte membrane of the present invention, a higher electrical conductivity at 25° C. is easily achievable, compared with Nafion®, by suitably selecting the production conditions described in the Examples below. This is considered to become possible because of the following reasons. Since graft molecular chains that are formed by photografting polymerization and are capable of holding sulfonic acid groups are present as nanoscale single chains in the direction of the membrane thickness, protons can move freely. Further, since the silane crosslinked structure or the multi-crosslinked structure has been introduced, the membrane is prevented from swelling by water, and, as a result, the interaction of adjacent sulfonic acid groups is facilitated to increase the transfer of ions. Another notable feature of introducing graft chains in the form of single chains in the direction of the membrane thickness is that it can be accomplished only by photografting polymerization in which graft chains can be extended from a surface to an inner part of the membrane. Further, in the case of an electrolyte membrane produced by ionizing radiation-induced graft polymerization, the silane crosslinked structure or the radiation-induced multi-crosslinked structure has been introduced, so the membrane is also prevented from swelling by water, and adjacent sulfonic acid groups do not move easily or freely. This is considered to allow improvement in conductivity.

Reducing the thickness of the polymer electrolyte membrane seems a possible way to increase the electrical conductivity of the polymer electrolyte membrane. In reality, however, a polymer electrolyte membrane that is too thin breaks easily, and therefore it is difficult to produce the membrane. For this reason, a polymer electrolyte membrane with a thickness of 30 µm to 200 µm is generally used. In the present invention, it is preferable that the membrane have a thickness in the range of 10 µm to 200 µm, preferably in the range of 20 µm to 100 µm.

Currently, methanol is viewed as a potential fuel for use in fuel cells. Nafion®, which is a perfluorosulfonic acid membrane, is swelled significantly by methanol because it has no crosslinked structure between molecular chains, and a crossover of the fuel, that is, diffusion of methanol serving as fuel from an anode (fuel electrode) to a cathode (air electrode) through a cell membrane causes the power generation efficiency to decrease. Those have been huge problems in the fuel-cell membranes. With the polymer electrolyte membrane of the present invention, on the other hand, graft molecular chains to which sulfonic acid groups have been introduced and a polymer film substrate are crosslinked to each other to form a structure that does not swell easily. Thus, swelling of the membrane due to alcohols, including methanol, is hardly observed. Therefore, the polymer electrolyte membrane of the present invention is suitable for use as a membrane in direct-methanol fuel cells, which use methanol directly as fuel without using a reformer.

On the other hand, in a case in which hydrogen is used as fuel, the fuel cell membrane is required to allow cell operation under high temperature of 100° C. or above for a long period of time. An important role that the electrolyte membrane has is to retain a suitable amount of water in the membrane, because sulfonic acid groups allow protons to move from the anode to the cathode only when water is retained. At 100° C. or above, the water in the electrolyte membrane is boiling. In the electrolyte membrane of the present invention, suppressed swelling due to the introduction of the silane crosslinked structure and the multi-crosslinked structure combines with the high water retention of silicon. This makes the electrolyte membrane useful as one that features excellent cell characteristics for the hydrogen fuel under high temperature but low water retention conditions.

The oxidation resistance of fuel cell membranes is an extremely important property that is related to its durability (durable period). OH radicals and the like are generated during cell operation and attack the ion-exchange membrane to deteriorate it. A polymer electrolyte membrane produced by first grafting a hydrocarbon-containing styrene to a polymer film substrate through radiation-induced graft polymerization and then performing sulfonation of polystyrene graft chains is extremely low in oxidation resistance. For example, if a polystyrene-grafted electrolyte membrane in which polystyrene chains with 40% grafting have been sulfonated is put in a 3% hydrogen peroxide solution at 60° C., the ion-exchange membrane will deteriorate in approximately 20 hours, causing elimination of electrically-conductive polystyrene sulfonic acid groups. This occurs because the polystyrene chains easily decompose when attacked by OH radicals.

In contrast, the polymer electrolyte membrane of the present invention uses radicals that are generated not only on the surface but also in the inner part of the polymer film substrate by irradiation with ionizing radiation. This makes it possible not only to introduce graft chains, like a myriad of branches, into "a tree trunk" (the polymer film substrate) but also to introduce single graft chains in nanoscale from the surface to the inner part of the substrate by photografting polymerization. It also becomes possible to introduce the silane crosslinked structure between the graft molecular chains and introduce the multi-crosslinked structure between a main chain of the substrate and graft molecules by use of ionizing radiation. Thus, the electrolyte membrane obtained by subsequent sulfonation is so high in oxidation resistance that its ion-exchange capacity will hardly change even if it is left in a 3% hydrogen peroxide aqueous solution at 80° C. for 500 hours or longer, and it shows high conductivity despite its low degree of grafting.

The following describes a preferred embodiment in regard to a membrane-electrode assembly using the polymer electrolyte membrane of the present invention. The membrane-electrode assembly of the present invention is characterized in that it is composed of the above-described polymer electrolyte membrane of the present invention, an anode electrode, and a cathode electrode.

The anode electrode and the cathode electrode are not particularly limited as long as they are the electrodes commonly used in the technical field contemplated by the present invention. For example, carbon paper with a coating of the. catalyst platinum and ruthenium-supported carbon black is usable as the anode electrode, and carbon paper with a coating of the catalyst platinum-supported carbon black is usable as the cathode electrode.

The membrane-electrode assembly of the present invention can be produced by disposing the above-described polymer electrolyte membrane of the present invention between the anode electrode and the cathode electrode and then assembling the respective components by a technique, such as hot pressing, that is commonly used in the technical field contemplated by the present invention.

The following further describes the present invention with reference to Examples and Comparative Examples. The present invention, however, is not limited to the Examples and Comparative Examples described below. Note that the properties of the polymer electrolyte membranes obtained in the Examples and in the Comparative Examples were measured by the following procedures.

(1) Degree of Grafting (%)

If a polymer film substrate of a polymer electrolyte membrane obtained is referred to as a main chain portion, and if a chain portion of the polymer electrolyte membrane obtained, which chain portion is formed as a result of graft polymerization of a vinyl monomer, is referred to as a graft chain portion, the ratio of the graft chain portion to the main chain portion by weight is expressed as the degree of grafting ($X_{dg}$[% by weight]) by the equation below:

[Equation 1]

$$X_{dg} = 100\,(W_2 - W_1)/W_1\,(\%),$$

where $W_1$ is the weight (g) of the polymer film substrate in a dry state before the graft polymerization, and $W_2$ is the weight (g) of the polymer film substrate in a dry state after the graft polymerization.

(2) Ion-Exchange Capacity (mmol/g)

The ion-exchange capacity (IEC) of the polymer electrolyte membrane is expressed by the equation below:

[Equation 2]

$$IEC = [n(\text{acid group})_{obs}]/W_d\,(\text{mmol/g}),$$

where [n(acid group)$_{obs}$] is the amount of acid groups (mM) in the ion-exchange membrane, and $W_d$ is the weight (g) of the dry ion-exchange membrane.

The [n(acid group)$_{obs}$] was measured as follows. The polymer electrolyte membrane obtained in each of the Examples was immersed in a 1M sulfuric acid solution at 50° C. for 4 hours to convert sulfonic acid groups into acid form (H-form) completely. Then, the membrane was immersed in a 3M NaCl aqueous solution at 50° C. for 4 hours so that the sulfonic acid groups were converted into —SO$_3$Na form. Neutralizing titration was performed on substituted protons (H$^+$) with 0.2M of NaOH to determine the concentration of acid groups.

(3) Water Content (%)

The H-form polymer electrolyte membrane stored in water at room temperature was taken out of the water and wiped lightly (approximately one minute); $W_s$ (g) denotes the weight of the membrane at this time. Then, the membrane was vacuum-dried at 60° C. for 16 hours; $W_d$ (g) denotes the weight of the membrane at this time. The water content (%) is calculated by the following equation:

[Equation 3]

$$\text{Water Content} = 100(W_s - W_d)/W_d\,(\%).$$

The water content indicates the degree of crosslinking in the electrolyte membrane; the lower the water content is, the more the crosslinked structures that are introduced.

(4) Proton Conductivity ($\Omega^{-1}\text{cm}^{-1}$)

The proton conductivity of the polymer electrolyte membrane was measured by use of the equation below (J. Chen, M. Asano, Y. Maekawa, T. Sakamura, H. Kubota, and M. Yoshida, Electrochemical and Solid-State Letters, 9(5), G184-G186 (2006), Preparation of fuel cell membranes by photografting in vapor and liquid phases)

[Equation 4]

$$\kappa = l/R_m \cdot d/S\,(\Omega^{-1}\text{cm}^{-1}),$$

where $\kappa$ is the electrical conductivity ($\Omega^{-1}\text{cm}^{-1}$) of the membrane, $R_m$ is the resistance ($\Omega$) of the membrane, d is the thickness (cm) of the electrolyte membrane, and S is the area (cm$^2$) of the electrolyte membrane through which electric current was passed.

The membrane was sandwiched between two platinum electrodes in the direction of the thickness of the membrane, and the impedance spectrum (in the range of 1 Hz to 100 kHz) was measured with an LCR meter (E-4925A of Hewlett-Packard). The membrane resistance ($R_m$) was calculated by use of the impedance spectrum.

(5) Oxidation Resistance (Conductive Group Elimination Time)

The oxidation resistance was measured in terms of the length of period (conductive groups elimination time) from the time when the electrolyte membrane was immersed in a 3% hydrogen peroxide (H$_2$O$_2$) aqueous solution at 60° C. to the time when the weight of the membrane started decreasing due to decomposition of the membrane, with the weight of the electrolyte membrane swollen to saturation in an aqueous solution at 60° C. being taken as a reference. Note that the conductive groups are sulfonic acid groups. The longer the above-defined time is, the better the oxidation resistance of the electrolyte membrane.

EXAMPLE 1

An ethylene-tetrafluoroethylene copolymer (hereinafter, this copolymer will be abbreviated to ETFE) film was cut into a size of 5 cm×5 cm×50 μm and put in a separable glass container equipped with a cock. Gas in the container was removed and then replaced with argon gas. Under this condition, the ETFE film was irradiated with 15 kGy of γ-rays from a $^{60}$Co source at room temperature. Then, a preliminarily-degassed solution (8 g of p-styryltrimethoxysilane in 12 g of toluene) which contained a vinyl silane coupling agent having an aromatic ring capable of holding sulfonic acid groups was put in the glass container, and the film was immersed in the solution. After replacing the gas in the glass container with argon gas, the glass container was closed tightly and left at 60° C. for 24 hours to let the reaction occur. The resulting graft-polymerized membrane was washed with toluene and dried. For sulfonation, the graft-polymerized membrane was immersed in 0.2M chlorosulfonic acid diluted with 1,2-dichloroethane, allowed to react at 80° C. for 10 hours, and then washed with water to effect hydrolysis, whereby an electrolyte membrane was produced. Then, in order to introduce a silane crosslinked structure into it, the electrolyte membrane was immersed in 1M hydrogen chloride solution at 80° C. for 24 hours to effect hydrolysis and condensation.

The ion-exchange capacity, the water content, the proton conductivity, and the oxidation resistance of the polymer electrolyte membrane obtained in this Example were measured. The results are shown in Table 1.

[Table 1]

TABLE 1

Properties of Polymer Electrolyte Membranes

| | Degree of Grafting (%) | Ion-Exchange Capacity (mmol/g) | Proton Conductivity ($[\Omega \cdot cm]^{-1}$) | Water Content (%) | Oxidation Resistance (hrs) |
|---|---|---|---|---|---|
| Example 1 | 36 | 0.37 | 0.015 | 11 | 350 |
| Example 2 | 36 | 1.87 | 0.15 | 46 | 720* |
| Example 3 | 38 | 1.89 | 0.12 | 40 | 720* |
| Example 4 | 45 | 2.19 | 0.21 | 71 | 490 |
| Example 5 | 45 | 2.16 | 0.22 | 76 | 410 |
| Example 6 | 45 | 2.16 | 0.18 | 64 | 550 |
| Example 7 | 43 | 2.11 | 0.25 | 79 | 370 |
| Example 8 | 44 | 2.01 | 0.02 | 50 | 310 |
| Example 9 | 43 | 1.88 | 0.13 | 41 | 720* |
| Example 10 | 55 | 1.51 | 0.05 | 40 | 205 |
| Example 11 | 55 | 1.50 | 0.06 | 45 | 180 |
| Example 12 | 55 | 1.49 | 0.05 | 41 | 260 |
| Example 13 | 50 | 1.91 | 0.11 | 43 | 720* |
| Example 14 | 25 | 1.60 | 0.08 | 25 | 720* |
| Example 15 | 9 | 0.81 | 0.11 | 15 | 720* |
| Example 16 | 7 | 0.75 | 0.08 | 12 | 720* |
| Example 17 | 40 | 2.01 | 0.17 | 60 | 530 |
| Comparative Example 1 Nafion ® 112 | — | 0.9 | 0.06 | 30 | 720* |
| Comparative Example 2 | 36 | 1.87 | 0.15 | 58 | 110 |
| Comparative Example 3 | 35 | 1.71 | 0.15 | 68 | 20 |

*No change in weight of the electrolyte membrane was observed during the test period of 720 hours.

According to Table 1, the oxidation resistance measured was 720 hours in some of the Examples including Example 1, and Comparative Example 1. This indicates that no decomposition occurred throughout the test period of 720 hours, meaning that the polymer electrolyte membranes have excellent oxidation resistance.

With regard to the water content which indicates the degree of crosslinking, for example Comparative Example 2 in which no crosslinked structure was introduced is higher in water content than Example 2 in which the crosslinked structure was introduced. This is because Comparative Example 2 has no crosslinked structure.

EXAMPLE 2

An electrolyte membrane was produced according to the procedure of Example 1, except that in the step of sulfonation, a graft-polymerized membrane was immersed in fuming sulfuric acid in place of the chlorosulfonic acid, and left to react at 60° C. for 2 hours. Then, the respective properties of the electrolyte membrane were measured. The results are shown in Table 1.

EXAMPLE 3

An electrolyte membrane was produced according to the procedure of Example 2, except that divinylbenzene which was a polyfunctional vinyl monomer was added to the solution containing the vinyl silane coupling agent to prepare a composition consisting of 0.4 g divinylbenzene, 7.6 g p-styryltrimethoxysilane, and 12 g toluene. Then, the respective properties of the electrolyte membrane were measured. The results are shown in Table 1.

EXAMPLE 4

An ETFE film was cut into a size of 5 cm×5 cm×50 μm and put in a separable glass container equipped with a cock. The gas in the container was removed and then replaced with argon gas. Under this condition, the ETFE film was irradiated with 15 kGy of γ-rays from a $^{60}$Co source at room temperature. Then, a preliminarily-degassed solution (0.8 g styrene, 7.2 g p-styryltrimethoxysilane, and 12 g toluene) which contained a vinyl silane coupling agent having an aromatic ring capable of holding sulfonic acid groups was put in the glass container, and the film was immersed in the solution. After replacing the gas in the glass container with argon gas, the glass container was closed tightly and left at 60° C. for 24 hours to let the reaction occur. The resulting graft-polymerized membrane was washed with toluene and dried. For sulfonation, the graft-polymerized membrane was immersed in fuming sulfuric acid, left to react at 60° C. for 2 hours, and then washed with water to effect hydrolysis, whereby an electrolyte membrane was produced. Thereafter, to introduce a silane crosslinked structure into it, the electrolyte membrane was immersed in 1M aqueous hydrogen chloride solution at 80° C. for 24 hours to effect hydrolysis and condensation. Results of the measurement of the respective properties are shown in Table 1.

EXAMPLE 5

An ETFE film was cut into a size of 5 cm×5 cm×50 μm and put in a separable glass container equipped with a cock. The gas in the container was removed and then replaced with argon gas. Under this condition, the ETFE film was irradiated with 15 kGy of γ-rays from a $^{60}$Co source at room temperature. Then, a preliminarily-degassed solution (0.8 g styrene, 7.2 g p-styryltrimethoxysilane, and 12 g toluene) which contained a vinyl silane coupling agent having an aromatic ring capable of holding sulfonic acid groups was put in the glass container, and the film was immersed in the solution. After replacing the gas in the glass container with argon gas, the glass container was closed tightly and left at 60° C. for 24 hours to let the reaction occur. The resulting graft-polymerized membrane was washed with toluene and dried. Thereafter, to introduce a silane crosslinked structure into it, the graft-polymerized membrane was immersed in 1M solution of hydrogenchloride in water and acetone (water : acetone=1:1 vol %) at 80° C. for 48 hours to effect hydrolysis and condensation. Then, for sulfonation, the graft-polymerized membrane to which the silane crosslinked structure had been introduced was immersed in fuming sulfuric acid, allowed to react at 60° C. for 2 hours, and then washed with water to effect hydrolysis, whereby an electrolyte membrane was produced. Results of the measurement of the respective properties are shown in Table 1.

EXAMPLE 6

The graft-polymerized membrane in Example 5 to which the silane crosslinked structure had been introduced and on which was yet to be sulfonated was irradiated with 500 kGy of γ-rays in an argon gas atmosphere at room temperature to introduce a radiation-induced multi-crosslinked structure into the membrane. The rest of the procedure was in accordance with Example 5. Then, the respective properties of the resulting electrolyte membrane were measured. The results are shown in Table 1.

EXAMPLE 7

An electrolyte membrane was produced according to the procedure of Example 4, except that a polyvinylidene fluoride (PVdF) film was used in place of the ETFE film and the graft polymerization was performed for 6 hours. Then, the respective properties of the electrolyte membrane were measured. The results are shown in Table 1.

EXAMPLE 8

An electrolyte membrane was produced according to the procedure of Example 4, except that a polypropylene (PP) film was used in place of the ETFE film and the graft polymerization was performed for 2 hours. Then, the respective properties of the electrolyte membrane were measured. The results are shown in Table 1.

EXAMPLE 9

An ETFE film was cut into a size of 5 cm×5 cm×50 μm and put in a separable glass container equipped with a cock. The gas in the container was removed and then replaced with argon gas. Under this condition, the ETFE film was irradiated with 15 kGy of γ-rays from a $^{60}$Co source at room temperature. Then, 20 g of a preliminarily-degassed solution (0.4 g divinylbenzene, 6.8 g p-styryltrimethoxysilane, 0.8 g styrene, and 12 g toluene) which contained a polyfunctional vinyl monomer, a vinyl silane coupling agent having an aromatic ring capable of holding sulfonic acid groups, and a vinyl monomer capable of holding sulfonic acid groups was put in the glass container, and the film was immersed in the solution. After replacing the gas in the glass container with argon gas, the glass container was closed tightly and left at 60° C. for 24 hours to let the reaction occur. The resulting graft-polymerized membrane was washed with toluene and dried. For sulfonation, the graft-polymerized membrane was immersed in fuming sulfuric acid, allowed to react at 60° C. for 2 hours, and then washed with water, whereby an electrolyte membrane was produced. Thereafter, in order to introduce a silane crosslinked structure into it, the electrolyte membrane was immersed in 1M aqueous hydrogen chloride solution at 80° C. for 24 hours to effect hydrolysis and condensation. Results of the measurement of the respective properties are shown in Table 1.

EXAMPLE 10

An ETFE film was cut into a size of 5 cm×5 cm×50 μm and put in a separable glass container equipped with a cock. The gas in the container was removed and then replaced with argon gas. Under this condition, the ETFE film was irradiated with 30 kGy of γ-rays from a $^{60}$Co source at room temperature. Then, a preliminarily-degassed solution (5.6 g styrene, 2.4 g vinyltrimethoxysilane, and 12 g toluene) which contained a vinyl monomer having an aromatic ring capable of holding sulfonic acid groups and a vinyl silane coupling agent having no aromatic ring was put in the glass container, and the film was immersed in the solution. After replacing the gas in the glass container with argon gas, the glass container was closed tightly and left at 60° C. for 24 hours to let the reaction occur. The resulting graft-polymerized membrane was washed with toluene and dried. For sulfonation, the graft-polymerized membrane was immersed in 0.2M chlorosulfonic acid diluted with 1,2-dichloroethane, allowed to react at 80° C. for 10 hours, and then washed with water to effect hydrolysis. Thereafter, in order to introduce a silane crosslinked structure into it, the resulting electrolyte membrane was immersed in 1M aqueous hydrogen chloride solution at 80° C. for 24 hours to effect hydrolysis and condensation. Results of the measurement of the respective properties are shown in Table 1.

EXAMPLE 11

An electrolyte membrane was produced according to the procedure of Example 10, except that a silane crosslinked structure was introduced prior to the sulfonation of the graft-polymerized membrane. Then, the respective properties of the electrolyte membrane were measured. The results are shown in Table 1.

EXAMPLE 12

An electrolyte membrane was produced according to the procedure of Example 11, except that in order to further introduce a radiation-induced multi-crosslinked structure, the graft-polymerized membrane to which the silane crosslinked structure had been introduced and which was yet to be sulfonated was irradiated with 500 kGy of γ-rays in an argon gas atmosphere at room temperature. Results of the measurement of the respective properties are shown in Table 1.

EXAMPLE 13

An ETFE film was cut into a size of 5 cm×5 cm×50 μm and put in a separable glass container equipped with a cock. The gas in the container was removed and then replaced with argon gas. Under this condition, the ETFE film was irradiated with 30 kGy of γ-rays from a $^{60}$Co source at room temperature. Then, 20 g of preliminarily-degassed solution (1.6 g 4-tert-butylstyrene, 4.8 g p-styryltrimethoxysilane, 1.6 g vinyltriethoxysilane, and 12 g toluene) which contained a vinyl monomer having an aromatic ring capable of holding sulfonic acid groups, a vinyl silane coupling agent having an aromatic ring capable of holding sulfonic acid groups, and a vinyl silane coupling agent having no aromatic ring was put in the glass container, and the film was immersed in the solution.

After replacing the gas in the glass container with argon gas, the glass container was closed tightly and left at 60° C. for 24 hours to let reaction occur. The resulting graft-polymerized membrane was washed with toluene and dried. For sulfonation, the graft-polymerized membrane was immersed in fuming sulfuric acid, allowed to react at 60° C. for 2 hours, and then washed with water. In order to introduce a silane crosslinked structure into it, the electrolyte membrane was immersed in 1M aqueous hydrogen chloride solution at 80° C. for 24 hours to effect hydrolysis and condensation. Results of the measurement of the respective properties are shown in Table 1.

EXAMPLE 14

An ETFE film cut into a size of 5 cm×5 cm×50 μm was immersed in an acetone solution containing 0.5 wt % xanthone and 0.5 wt % polyvinyl acetate (molecular weight: 100,000) so that xanthone was applied to a surface of the film in an amount of $3\times10^{-3}$ mg/cm$^2$ to form an over-coating layer. The film was put in a separable glass container equipped with a cock, and the gas in the container was removed. Then, 20 ml of 2.5 wt % p-styryltrimethoxysilane solution diluted with a preliminarily-degassed mixture of acetone and water (5:1 vol %) was put in the glass container, and the film with the xanthone coating was immersed in the solution. After replacing the gas in the glass container with argon gas, the glass container was closed tightly and irradiated with ultraviolet rays from a high pressure mercury lamp (400 W) as a light source at 60° C. for 4 hours, whereby photografting polymerization in a liquid phase system was performed. The resulting photografting-polymerized membrane was washed with acetone and dried. For sulfonation, the graft-polymerized membrane was immersed in fuming sulfuric acid, allowed to react at 60° C. for 2 hours, and then washed with water to effect hydrolysis. In order to introduce a silane crosslinked structure into it, the resulting electrolyte membrane was immersed in 1M aqueous hydrogen chloride solution at 80° C. for 24 hours to effect hydrolysis and condensation. Results of the measurement of the respective properties are shown in Table 1.

EXAMPLE 15

An electrolyte membrane was produced according to the procedure of Example 14, except that polytetrafluoroethylene (hereinafter, this will be abbreviated to PTFE) was used in place of ETFE and the photografting polymerization was performed at the same temperature for four hours. Then, the respective properties of the electrolyte membrane were measured. The results are shown in Table 1.

EXAMPLE 16

A PTFE film that had been cut into a size of 5 cm×5 cm×50 μm was immersed in an acetone solution containing 0.5 wt % xanthone and 0.5 wt % polyvinyl acetate (molecular weight: 100,000) so that xanthone was applied to a surface of the film in an amount of $3\times10^{-3}$ mg/cm$^2$ to form an under-coating layer. The film was put in a separable glass container with a cock, and the gas in the container was removed. Then, 20 ml of solution diluted with a preliminarily-degassed mixture of acetone and water (5:1 vol %) and which contained 2.5 wt % styrene and 2.5 weight % p-styryltrimethoxysilane was put in the glass container, and the film with the xanthone undercoating was immersed in the solution. After replacing the gas in the glass container with nitrogen gas, the glass container was closed tightly and irradiated with ultraviolet rays from a high pressure mercury lamp (400W) as a source of the light at 60° C. for 4 hours, whereby photografting polymerization in a liquid phase system was performed. The resulting photografting-polymerized membrane was washed with acetone and dried. For sulfonation, the graft-polymerized membrane was immersed in fuming sulfuric acid, allowed to react at 60° C. for 2 hours, and then washed with water to effect hydrolysis. In order to introduce a silane crosslinked structure into it, the resulting electrolyte membrane was immersed in 1M aqueous hydrogen chloride solution at 80° C. for 24 hours to effect hydrolysis and condensation. Results of the measurement of the respective properties are shown in Table 1.

EXAMPLE 17

An electrolyte membrane was produced according to the procedure of Example 7, except that prior to introducing graft molecular chains, a PVdF film was irradiated with 500 kGy of γ-rays in an argon gas atmosphere at room temperature to introduce a radiation-induced crosslinked structure into the PVdF film. Results of the measurement of the respective properties are shown in Table 1.

COMPARATIVE EXAMPLE 1

The ion-exchange capacity, the water content, and the proton conductivity of a Nafion® 112 (DuPont) were measured. The results are shown in Table 1.

COMPARATIVE EXAMPLE 2

An electrolyte membrane was prepared as in Example 1, except that sulfonation was not followed by the introduction of the silane crosslinked structure (no HCl treatment was done). Then, the respective properties of the electrolyte membrane were measured. The results are shown in Table 1.

COMPARATIVE EXAMPLE 3

An ETFE film that had been cut into a size of 5 cm×5 cm×50 μm was put in a separable glass container equipped with a cock. The gas in the container was removed and then replaced with argon gas. Under this condition, the ETFE film was irradiated with 15 kGy of γ-rays from a $^{60}$Co source at room temperature. Then, 20g of a preliminarily-degassed solution (40 wt % styrene and 60 wt % toluene) which contained a vinyl silane coupling agent having an aromatic ring capable of holding sulfonic acid groups was put in the glass container, and the film was immersed in the solution. After replacing the gas in the glass container with argon gas, the glass container was closed tightly and left at 60° C. for 2 hours to let the reaction occur. The resulting graft-polymerized membrane was washed with toluene and dried. For sulfonation, the graft-polymerized membrane was immersed in fuming sulfuric acid, allowed to react at 60° C. for 2 hours, and then washed with water to effect hydrolysis, whereby an electrolyte membrane was produced. Results of the measurement of the respective properties are shown in Table 1.

Industrial Applicability

Electrolyte membranes of the present invention have excellent electrical conductivity and oxidation resistance in spite of their low ion-exchange capacity. The electrolyte membranes of the present invention also have high water retention and dimensional stability under high temperature. Thus, the electrolyte membranes of the present invention are applicable as polymer electrolyte membranes suitable for use in fuel cells that employ methanol, hydrogen and the like for fuel and are expected to serve as power supplies or convenient auxiliary power supplies to mobile devices, household cogeneration systems, and automobiles.

The invention claimed is:

1. A polymer electrolyte membrane for a fuel cell, wherein: graft molecular chains formed by graft-polymerization of a vinyl monomer have been introduced into a polymer film substrate; the graft molecular chains have phenyl groups holding sulfonic acid groups; and a silane crosslinked structure has been introduced between the graft molecular chains.

2. The membrane according to claim 1, wherein a multi-crosslinked structure has been introduced between molecular chains that the polymer film substrate has, between the graft molecular chains to which the silane crosslinked structure has been introduced, and between the molecular chains that the polymer film substrate has and the graft molecular chains to which the silane crosslinked structure has been introduced.

3. The membrane according to claim 1 or 2, wherein the polymer film substrate is composed of an olefinic polymer or a fluorine-containing polymer.

4. A process for producing a polymer electrolyte membrane for a fuel cell, the process comprising in sequence: forming graft molecular chains by graft-polymerization of a vinyl silane coupling agent to a polymer film substrate, the vinyl silane coupling agent having phenyl groups capable of holding sulfonic acid groups; introducing sulfonic acid groups into phenyl groups contained in the graft molecular chains; and hydrolyzing and condensing alkoxy groups contained in the graft molecular chains so that a silane crosslinked structure is introduced between the graft molecular chains.

5. A process for producing a polymer electrolyte membrane for a fuel cell, the process comprising in sequence: forming graft molecular chains by graft-polymerization of a vinyl monomer solution on a polymer film substrate, the vinyl monomer solution containing a vinyl silane coupling agent having phenyl groups capable of holding sulfonic acid groups; hydrolyzing and condensing alkoxy groups contained in the graft molecular chains so that a silane crosslinked structure is introduced between the graft molecular chains; and introducing sulfonic acid groups into phenyl groups contained in the graft molecular chains.

6. A process for producing a polymer electrolyte membrane for a fuel cell, the process comprising in sequence: forming graft molecular chains by graft-polymerization of a vinyl monomer solution on a polymer film substrate, the vinyl monomer solution being composed of a vinyl monomer having phenyl groups capable of holding sulfonic acid groups, and a vinyl silane coupling agent containing no phenyl group; introducing sulfonic acid groups into phenyl groups contained in the graft molecular chains; and hydrolyzing and condensing alkoxy groups contained in the graft molecular chains so that a silane crosslinked structure is introduced between the graft molecular chains.

7. A process for producing a polymer electrolyte membrane for a fuel cell, the process comprising in sequence: forming graft molecular chains by graft-polymerization of a vinyl monomer solution on a polymer film substrate, the vinyl monomer solution being composed of a vinyl monomer having phenyl groups capable of holding sulfonic acid groups, and a vinyl silane coupling agent containing no phenyl group; hydrolyzing and condensing alkoxy groups contained in the graft molecular chains so that a silane crosslinked structure is introduced between the graft molecular chains; and introducing sulfonic acid groups into phenyl groups contained in the graft molecular chains.

8. The process according to claim 6 or 7, wherein, in the step of forming the graft molecular chains, a vinyl silane coupling agent having phenyl groups capable of holding sulfonic acid groups is combined with the vinyl monomer solution.

9. The process according to any one of claims 5 to 7, wherein, in the step of forming the graft molecular chains, a polyfunctional vinyl monomer to which a chemical crosslinked structure is introducible is combined with the vinyl monomer solution.

10. The process according to claim 5 or 7, further comprising, following the step of introducing the silane crosslinked structure, applying γ-rays, electron beams, or X-rays to introduce a radiation-induced multi-crosslinked structure between molecular chains that the polymer film substrate has, between the graft molecular chains to which the silane crosslinked structure has been introduced, and between the molecular chains that the polymer film substrate has and the graft molecular chains to which the silane crosslinked structure has been introduced, and thereafter introducing sulfonic acid groups.

11. The process according to any one of claims 4 to 7, wherein, in the step of forming the graft molecular chains, the graft-polymerizing is performed by use of radicals generated by irradiating the polymer film substrate with γ-rays, electron beams, or X-rays.

12. The process according to any one of claims 4 to 7, wherein, in the step of forming the graft molecular chains, the graft-polymerizing is performed by use of radicals generated during a process of applying a photopolymerization initiator to the polymer film substrate and irradiating the polymer film substrate with ultraviolet rays.

13. The membrane according to any one of claims 4 to 7, wherein the polymer film substrate has a crosslinked structure that is introduced by ionizing radiation.

14. The membrane according to any one of claims 4 to 7, wherein the polymer film substrate is composed of an olefinic polymer or a fluorine-containing polymer.

15. A membrane-electrode assembly for fuel cells, the assembly comprising the polymer electrolyte membrane according to claim 1, an anode electrode and a cathode electrode.

16. A membrane-electrode assembly for fuel cells, the assembly comprising the polymer electrolyte membrane according to claim 2, an anode electrode and a cathode electrode.

17. A membrane-electrode assembly for fuel cells, the assembly comprising the polymer electrolyte membrane according to claim 3, an anode electrode and a cathode electrode.

* * * * *